United States Patent

Hay et al.

[11] Patent Number: 5,877,426
[45] Date of Patent: Mar. 2, 1999

[54] BOURDON TUBE PRESSURE GAUGE WITH INTEGRAL OPTICAL STRAIN SENSORS FOR MEASURING TENSION OR COMPRESSIVE STRAIN

[75] Inventors: Arthur D. Hay, Cheshire; Robert J. Maron, Cromwell; James R. Dunphy, South Glastonbury, all of Conn.; Phillip Edmund Pruett, Bakersfield, Calif.

[73] Assignee: CiDRA Corporation, Wallingford, Conn.

[21] Appl. No.: 883,858

[22] Filed: Jun. 27, 1997

[51] Int. Cl.⁶ ........................................... G01L 9/00
[52] U.S. Cl. .................... 73/733; 73/705; 73/708; 250/227.14
[58] Field of Search ................... 73/734, 736, 708, 73/705, 733; 250/227.14, 231.19, 227.19; 385/10; 338/4, 42

[56] References Cited

U.S. PATENT DOCUMENTS

| | | | |
|---|---|---|---|
| 3,527,100 | 9/1970 | Talmo et al. | 73/734 |
| 4,900,937 | 2/1990 | Dayton et al. | 250/483.1 |
| 5,042,898 | 8/1991 | Morey et al. | 385/37 |
| 5,138,155 | 8/1992 | Gray | 250/231.19 |
| 5,163,321 | 11/1992 | Perales | 73/718 |
| 5,308,973 | 5/1994 | Odoni et al. | 250/227.17 |
| 5,315,110 | 5/1994 | Smith | 250/227.17 |
| 5,317,576 | 5/1994 | Leonberger et al. | 372/6 |
| 5,319,435 | 6/1994 | Melle et al. | 250/227.18 X |
| 5,357,806 | 10/1994 | Dennis et al. | 73/718 |
| 5,363,463 | 11/1994 | Kleinerman | 385/123 |
| 5,399,854 | 3/1995 | Dunphy et al. | 250/227.17 |
| 5,444,803 | 8/1995 | Kim et al. | 385/28 |
| 5,452,087 | 9/1995 | Taylor et al. | 356/352 |
| 5,485,745 | 1/1996 | Rademaker et al. | 73/151 |
| 5,495,237 | 2/1996 | Yuasa et al. | 340/854.6 |
| 5,499,533 | 3/1996 | Miller et al. | 73/152 |
| 5,548,116 | 8/1996 | Pandelisev | 250/256 |
| 5,682,445 | 10/1997 | Smith | 385/10 X |

OTHER PUBLICATIONS

"High Sensitivity Intrinsic Fiber–Optic Fabry–Perot Pressure Sensor", Optics Letters/vol. 21, No. 8/Apr. 15, 1996, pp. 615–617.

*Primary Examiner*—Joseph L. Felber

[57] ABSTRACT

A Bourdon tube pressure gauge is mounted for sensing the pressure of a system. The Bourdon tube is connected to at least one optical strain sensor mounted to be strained by movement of the Bourdon tube such that when the Bourdon tube is exposed to the pressure of the system, movement of the tube in response to system pressure causes a strain in the optical sensor. The optical sensor is responsive to the strain and to an input optical signal for providing a strain optical signal which is directly proportional to the pressure. A reference or temperature compensation optical sensor is isolated from the strain associated with the pressure of the system and is responsive to temperature of the system for causing a temperature-induced strain. The reference optical sensor is responsive to the temperature induced strain and the input optical signal for providing a temperature optical signal which is directly proportional to the temperature of the system. The temperature optical signal is provided for temperature compensation of the strain optical signal. The optical sensors include an optical fiber having intrinsic Bragg grating sensors formed in the optical fiber. The optical fiber is attached to a reference point and to the Bourdon tube such that changes in the position of the tube changes the strain on the optical fiber resulting in a wavelength shift of light reflected by the Bragg grating. The magnitude of the wavelength shift is directly proportional to a change in pressure.

18 Claims, 7 Drawing Sheets

BOURDON TUBE PRESSURE GAUGE WITH INTEGRAL OPTICAL STRAIN SENSORS FOR MEASURING TENSION OR COMPRESSIVE STRAIN

TECHNICAL FIELD

The present invention relates to pressure gauges, and more particularly to Bourdon tube pressure gauges utilizing optical strain sensors.

BACKGROUND OF THE INVENTION

In many processes or test procedures, the need to measure specific or general pressure can be paramount in controlling the respective process or for understanding the conditions being encountered. A variety of pressure sensor designs are typically used to measure such a pressure, including strain gauge sensors, Bourdon tubes, quartz sensors, and hybrids of any of the above. For example, Bourdon tube designs exist whereby a tube is open and fixed at one end, with the interior of the tube being exposed to system pressure for pressure monitoring. The other end of the tube is closed and is free to move. When the tube is exposed to system pressure, the movement of the free end of the tube is directly related to the magnitude of the system pressure. The free end of the tube may be connected via a direct acting mechanical linkage that is coupled to a pointer that travels over a calibrated scale readout for providing an indication of the system pressure.

Another Bourdon tube design uses the movement of the Bourdon tube to stress a quartz crystal. The change in reactance of the crystal under stress can be measured locally within the pressure gauge and referenced electronically to a calibrated look-up table for the actual pressure. Design variations of the above measure changes in resonance or strain via strain gauges.

Although the reliability of the basic Bourdon tube is very high, the adhesives and electronic components used in current Bourdon tube quartz crystal designs are very susceptible to failure, especially at high local or ambient temperatures. For example, at temperatures greater than 125° C. the electronic circuitry associated with a strain gauge or a quartz crystal degrades such that the reliability of the system is jeopardized in terms of both accuracy and functionality. Additionally, the various adhesives used with such a strain gauge or quartz crystal are prone to failure at temperatures greater than 125° C. Therefore, there exists a need for a reliable pressure sensor design, which is particularly suited for use at high local or ambient temperature conditions.

SUMMARY OF THE INVENTION

Objects of the invention include an improved Bourdon tube pressure gauge which is utilized in conjunction with optical strain sensors for providing a pressure gauge which is accurate and reliable at high temperature and pressure conditions.

A further object of the present invention is to provide such a pressure gauge, which is temperature compensated over the full range of operating temperatures of the pressure gauge.

According to the present invention, a Bourdon tube pressure gauge is connected to at least one optical strain sensor mounted to be strained by movement of the Bourdon tube such that when the Bourdon tube is exposed to the pressure of a system being monitored, movement of the tube in response to system pressure causes a strain in the optical sensor, the optical sensor being responsive to the strain and to an input optical signal for providing a strain optical signal which is related to the pressure.

According further to the present invention, the optical sensor includes an optical fiber having an intrinsic Bragg grating sensor formed in the optical fiber, the optical fiber being attached to a reference point and to the Bourdon tube such that changes in the position of the tube changes the strain on the optical fiber resulting in a wavelength shift of light reflected by the Bragg grating, the magnitude of the wavelength shift being indicative of a change in pressure.

According still further to the present invention, the Bragg grating sensor is mounted between the Bourdon tube and the reference point under an initial strain condition, and wherein the initial strain changes in response to changes in the position of the Bourdon tube in response to changes in system pressure.

In further accord with the present invention, a reference or temperature compensation optical sensor is isolated from the mechanical strain associated with the pressure of the system and is responsive to the temperature of the system for causing a temperature induced strain, the reference optical sensor being responsive to the temperature induced strain and the input optical signal for providing a temperature optical signal which is related to the temperature of the system, the temperature optical signal being provided for temperature compensation of the strain optical signal. The reference optical sensor may also be a Bragg grating sensor.

In still further accord with the present invention, light reflected by the Bragg grating sensors may be remotely sensed to thereby provide a remote measurement of locally sensed pressure and temperature.

According still further to the present invention, a plurality of Bragg gratings may be arranged with respect to the Bourdon tube such that in response to changes in the position of the Bourdon tube caused by a change in pressure of the system, the strain on at least one Bragg grating is increased while the strain on at least one additional Bragg grating sensor is reduced, each Bragg grating sensor being responsive to an input optical signal and the strain for providing an output strain signal indicative of the system pressure.

In still further accord with the invention, the Bragg gratings may be provided in several different arrangements, including being attached directly to the surface of the Bourdon tube, or connected between the end of the Bourdon tube and a referenced location. The Bourdon tube may be a simple, generally circular or arc shaped Bourdon tube, or alternatively a helical shaped Bourdon tube or other suitable tube configuration may be utilized.

In ftuther accord with the present invention, a plurality of pressure gauges may be coupled to a single optical fiber, and the separate signals from each sensor may be provided via wavelength division multiplexing techniques, time division multiplexing techniques or a combination thereof.

The present invention provides a significant improvement over the prior art. A simple pressure gauge is provided which is particularly suited for use in high temperature, high pressure and hostile environments. Additionally, the gauge of the present invention is easily temperature compensated for providing a reliable and accurate pressure signal. There is no requirement to provide electronic processing equipment directly at the gauge location as the light signals reflected by the optical strain sensors in the gauge can be transmitted via an optical fiber to a remote location for processing. Therefore, a very highly reliable and accurate pressure gauge is provided. The optical fiber and sensors utilized with the invention are functional over a wide temperature range, and therefore, the gauges of the invention may be used in both hazardous and high temperature locations.

The foregoing and other objects, features and advantages of the present invention will become more apparent in light of the following detailed description of exemplary embodiments thereof, as illustrated in the accompanying drawings.

DETAILED DESCRIPTION OF THE INVENTION

Figure 1:
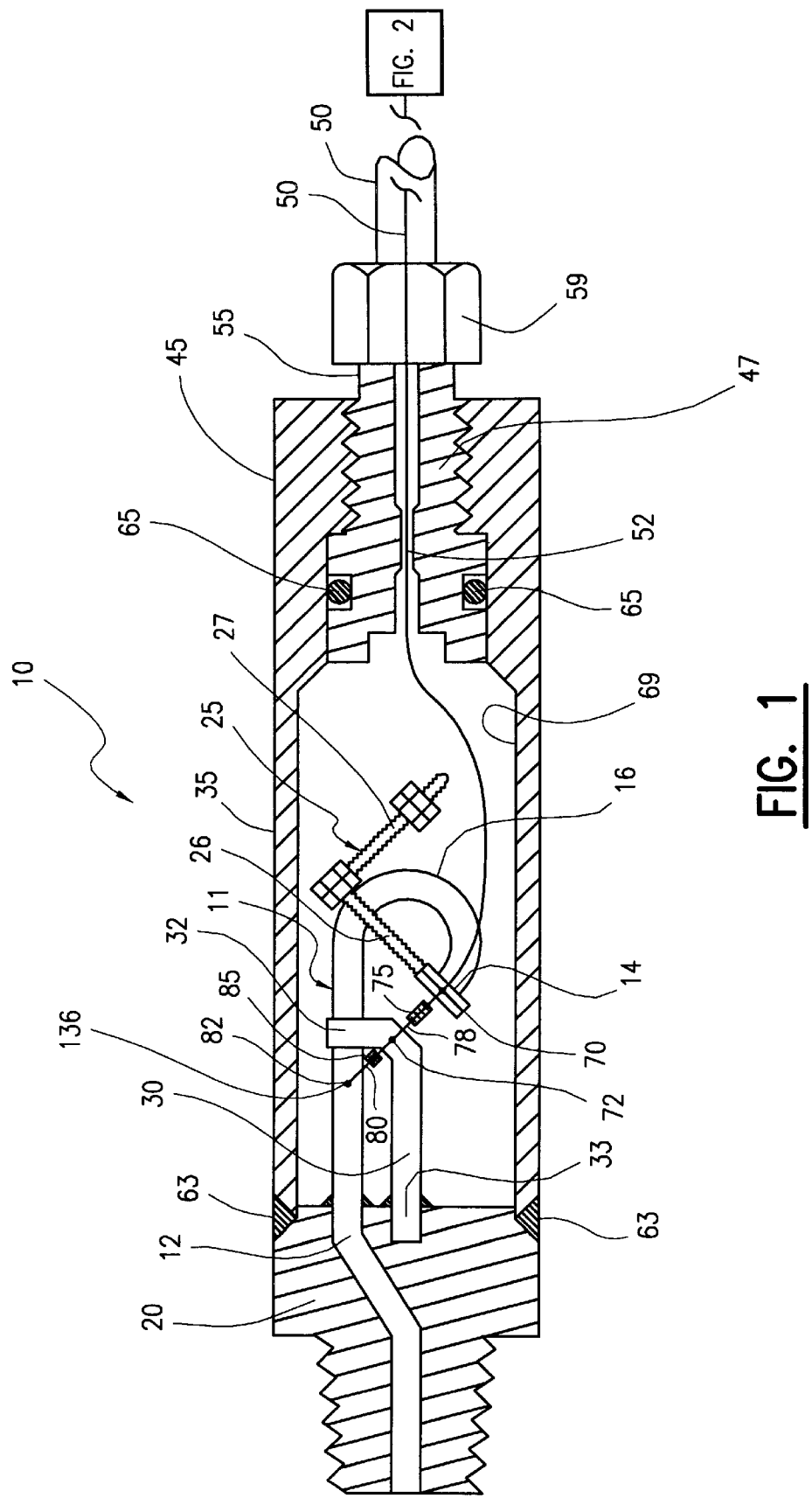
FIG. 1 is a cross-sectional view of a pressure gauge utilizing optical strain sensors in accordance with the present invention.

The Bourdon tube pressure gauge 10 of the invention is particularly well suited for operation in a high temperature, high pressure and/or hazardous environment for providing reliable pressure indications. Referring to FIG. 1, the invention relies on the basic principle of a Bourdon tube 11 wherein one end of the tube 12 is open to the pressure of the environment to be monitored and the other end of the tube 14 is closed and free to move. In the example of FIG. 1, the Bourdon tube 11 is in the shape of an arc 16 and the open end of the tube 12 is fixed, for example to a base or mounting member 20 and the closed end of the tube 14 is free to move. When the open end of the tube 12 is exposed to the pressure of the system being monitored, the closed free end of the tube 14 will move in response to changes in the system pressure.

In the example of the present invention a counterweight or compensation assembly 25, including adjustable weights in multiple axes 26, 27, is provided to minimize inertial effects on the Bourdon tube 11 due to vibration. Any suitable compensation technique, such as the illustrated conventional three-axis compensation technique, may be used with the invention to stabilize any vibration-induced deflection of the tube 11. Therefore, the compensation assembly counteracts changes in the responsiveness of the Bourdon tube 11 to the pressure of the environment based on the orientation of the overall pressure gauge 10 and any inertial effects. If the pressure gauge 10 will always be placed in a known orientation and will not be subject to vibration or other inertial effects, the Bourdon tube 11 can be designed such that the compensation assembly 25 is not required.

In the embodiment of the invention illustrated in FIG. 1, a mounting post 30 is provided to support the Bourdon tube 11 at a mounting location 32. The other end 33 of the mounting post 30 is fixed to the base 20. The mounting post 30 is made of a high strength material having a low coefficient of thermal expansion such that it does not react to the high temperature environment. Additionally, the mounting post 30 is designed to minimize the motion of the Bourdon tube 11 in response to vibration or other mechanical shock which the gauge 10 is exposed to.

A housing 35 is mounted to the base 20 for enclosing the Bourdon tube 11.

The other end 45 of the housing 35 includes a mounting and packer assembly 47 through which passes an optical fiber 50. Within the packer assembly 47, the optical fiber 50 passes through a high pressure optical fiber seal 52 to thereby completely seal the internal environment of the gauge 10. The end of the packer assembly 47 is provided with a mount 55 for mounting a high strength capillary tube 57 thereto, for example via a locking nut 59. The housing 35, base 20, packer 47, capillary tube 50 and accompanying mounting equipment may be made of high temperature, pressure and corrosion resistant material, such as stainless steel. The housing 35 may be mounted to the base 20 and sealed thereto via a weld 63. Additionally, an O-ring seal 65 may be provided between the packer assembly 47 and housing 35 to thereby provide a pressure-tight seal. The internal compartment 69 of the gauge 10 created by the housing 35, base 20 and packer assembly 47 creates a chamber, which may be evacuated to thereby provide an absolute pressure gauge. Alternatively, the internal compartment 69 may be filled with an inert gas to a known pressure, as desired.

The optical fiber 50 is mounted at a first mounting location 70 to the free end 14 of the Bourdon tube 11 and at a second mounting location 72 to the mounting post 30. The optical fiber 50 is mounted at the mounting locations by suitable high strength, high temperature resistant mounting means, such as high temperature adhesive, welding, or any other suitable mounting means. A Bragg grating 75 is formed in the fiber 50 between the first and second mounting locations 70, 72. In the embodiment of the invention illustrated in FIG. 1, the first length 78 of fiber 50 between the first and second mounting locations 70, 72 containing the Bragg grating 75 is mounted to be under a pre-stress condition when the Bourdon tube 11 is not subject to system pressure. By mounting the fiber length 78 under a pre-stress, the Bragg grating 75 is under a known initial stress, and changes in stress of the Bragg grating 75 associated with changes in the Bourdon tube 11 associated with changing pressure is easily determined. A second length 80 of the fiber 50 is connected between the second mounting location 72 and a third mounting location 82 by a suitable mounting method as described above. A second Bragg grating 85 is formed in the second length 80 of the fiber 50. The second length 80 of the fiber 50 is mounted such that it is not under a pre-strain, and also such that it does not experience a strain associated with the pressure of the system. Therefore, the second Bragg grating 85 is intended to only experience a change in strain associated with temperature, and is isolated from strain caused by other influences.

As is known to those skilled in the art, fiber gratings (Bragg gratings) are well suited for use as strain sensing elements. When a fiber grating is illuminated, the grating reflects a narrow band of light having a specified central wavelength. However, a measurand, such as strain induced by pressure or temperature, will induce a perturbation of the grating sensor spacing due to overall fiber elongation, and of the refractive index of the glass due to photoelastic effects, which together change the wavelength of the light reflected by the grating. The value of the measurand is directly related to the wavelength reflected by the grating and can be determined by detecting the wavelength of the reflected light.

As is further known in the art, the wavelength-encoded nature of the output of fiber gratings has advantages over intensity based sensing techniques because of the self-referencing nature of the output. This sensed information is encoded directly into the wavelength, which is an absolute parameter and does not depend upon total light levels, losses in fibers or couplers, or variations in source intensity. In contrast, intensity-based sensing schemes depend upon total light levels and are affected by losses in the connected fibers, by losses in couplers, and by variations in source intensity.

Figure 2:
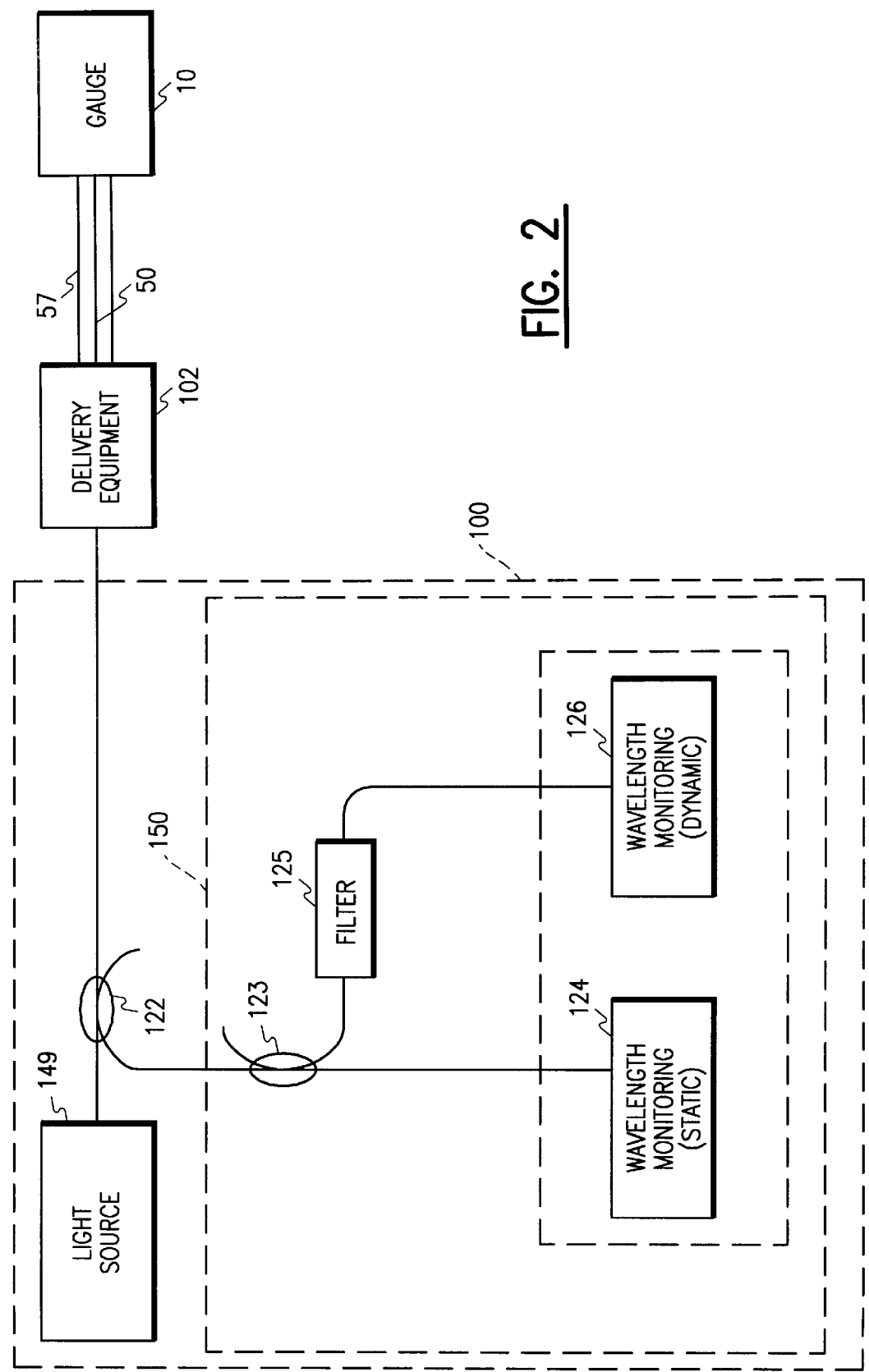
FIG. 2 is a schematic block diagram of optical signal processing equipment used with the pressure gauge of FIG. 1.

Referring also to FIG. 2, the pressure gauge 10 is positioned at a distal end of the capillary tubing 57 and is interconnected to optical signal processing equipment 100 via the optical fiber 50 and well-known capillary tube delivery equipment 102. The delivery equipment 102 is utilized for delivering the pressure gauge 10 and the capillary tubing 57 to an environment to be monitored, such as the harsh environment of a wellbore of an oil and/or gas well (not shown), and for the delivery of optical signals between the optical signal processing equipment 100 and the pressure gauge 10, either directly or via the interface equipment 102 as required.

The optical signal processing equipment 100 includes, at a minimum, a broadband source of light 149, such as the light emitting diode (LED), and appropriate equipment for delivery of signal light to the Bragg gratings 75, 85 (FIG. 1) included within a core of the optical fiber 50. Additionally, the optical signal processing equipment 100 includes appropriate optical signal analysis equipment 150 for analyzing the return signals from the Bragg gratings 75, 85 (FIG. 1).

FIG. 2 shows an arrangement for monitoring the wavelength shifts produced by the Bragg grating sensors 75, 85 (FIG. 1) to provide both static pressure and temperature monitoring, along with high resolution sensing for transient pressure fluctuations, to the extent that dynamic pressure can be sensed by a Bourdon tube. Each of the Bragg gratings 75, 85 (FIG. 1) acts as a resonant reflector, and operates as a sensor mounted to respond in the manner described herein.

Light from the broadband optical source 149 is coupled to the fiber 50 via a coupler 122. This coupler 122 directs light to the gauge assembly 10, and directs the reflected optical components from the Bragg grating sensors 75, 85 (FIG. 1) to the optical signal analysis equipment 150 including wavelength monitoring sub-systems, 124 and 126. One of the wavelength monitoring systems 124 allows for the detection of wavelength shifts of the Bragg grating elements using an 'absolute' approach for static parameter monitoring (e.g. pressure & temperature). The other wavelength monitoring system 126 provides for detecting weak dynamically induced shifts for transient or dynamic pressure monitoring, to the extent that the Bourdon tube 11 (FIG. 1) is responsive to pressure transients.

In order to monitor static wavelength shifts, the returned optical components are directed into an optical wavelength analyzer 124, such as a scanning narrowband filter, which produces a measure of the Bragg wavelength of the signal light reflected by the Bragg gratings 75, 85 (FIG. 1). Static pressure can be deduced from the differential shift of the Bragg wavelengths produced by Bragg grating 75, (FIG. 1) whereas the temperature is determined directly from a measure of the Bragg wavelength of Bragg grating 85 (FIG. 1). The temperature measurement can be used to temperature compensate the pressure measurement.

A portion of the returned optical components is split off, using a coupler 123, to an alternative wavelength discriminator 126 to thereby provide high resolution monitoring of wavelength shifts. In order to separate the responses of the different gratings 75, 85, (FIG. 1) a portion of the returned optical components from the gratings are directed to a wavelength filter or router 125. This device separates the optical signals produced by each Bragg grating by means of selective filtering. The pass-bands of this device are wide enough to ensure that under normal operating conditions (fall temperature & pressure range), the optical signal produced by, for example grating 75 (FIG. 1) is always passed. The outputs of the router can then be analyzed using sensitive wavelength discriminators 126 to determine wavelength modulation effects due to vibration or dynamic pressure. By tuning the filter 125 passband, the separate gratings in the system can be analyzed individually. Alternatively, a wavelength division demultiplexer could be used to separate the wavelength components onto separate fibers, which could then be each analyzed, via separate high-resolution wavelength discriminators. An example of the type of wavelength discriminators suitable for this purpose is the interferometric detection approach described in U.S. Pat. No. 5,361,130, the disclosure of which is incorporated herein by reference.

Although a specific embodiment of the optical signal processing equipment 100 is described above, other optical signal analysis techniques may be used with the present invention such as the necessary hardware and software to implement the optical signal diagnostic equipment disclosed in U.S. Pat. Nos. 4,996,419; 5,401,956; 5,426,297; and/or 5,493,390, the disclosures of which are incorporated herein by reference.

As is well known in the art, there are various optical signal analysis approaches, which may be utilized, to analyze return signals from optical fiber Bragg gratings. These approaches may be generally classified in the following four categories:

1. Direct spectroscopy utilizing conventional dispersive elements such as line gratings, prisms, etc., and a linear array of photo detector elements or a CCD array;
2. Passive optical filtering using both optics or a fiber device with wavelength-dependent transfer finction, such as a WDM coupler;
3. Tracking using a tuneable filter such as, for example, a scanning Fabry-Perot filter, an acousto-optic filter such as the filter described in the above referenced U.S. Pat. No. 5,493,390, or fiber Bragg grating based filters; and
4. Interferometric detection.

The particular technique utilized will vary, and will depend on the Bragg wavelength shift magnitude (which depends on the sensor sensitivity and measurand strength) and the frequency range of the measurand to be detected.

Returning to FIG. 1, a distal end 136 of the fiber 50, mounted for example at the third mounting location 82 is terminated in an anti-reflective manner so as to prevent interference with the reflected wavelengths from the Bragg gratings 75, 85. For example, the distal end 136 of the fiber 50 may be cleaved at an angle so that the end face is not perpendicular to the fiber axis. Alternatively, the distal end 136 of the fiber 50 may be coated with a material that matches the index of refraction of the fiber, thus permitting light to exit the fiber without back reflection, and be subsequently disbursed in the index-matching material.

As disclosed above, each Bragg grating 75, 85 consists of a periodic variation of the index of refraction of the fiber core material (i.e. a variation in the speed of light within the fiber core), which forms a resonant cavity for particular central wavelengths of light corresponding to particular periodic grating spacing. Such a resonant cavity will then reflect only light of this particular central wavelength $\lambda$, while permitting light of all other wavelengths to pass without significant attenuation. It is well known that if strain is applied to the reflective grating, a change in the central wavelength of the resonant cavity will occur due to a change in the periodic spacing of the grating, and which will appear as a wavelength shift in the reflected light. If the strain is produced by a change in the strain on the fiber, such as by means of the Bourdon tube 11, then the wavelength shift of the central reflected wavelength can be related to the pressure change, which caused the movement of the Bourdon tube 11.

Figure 3:
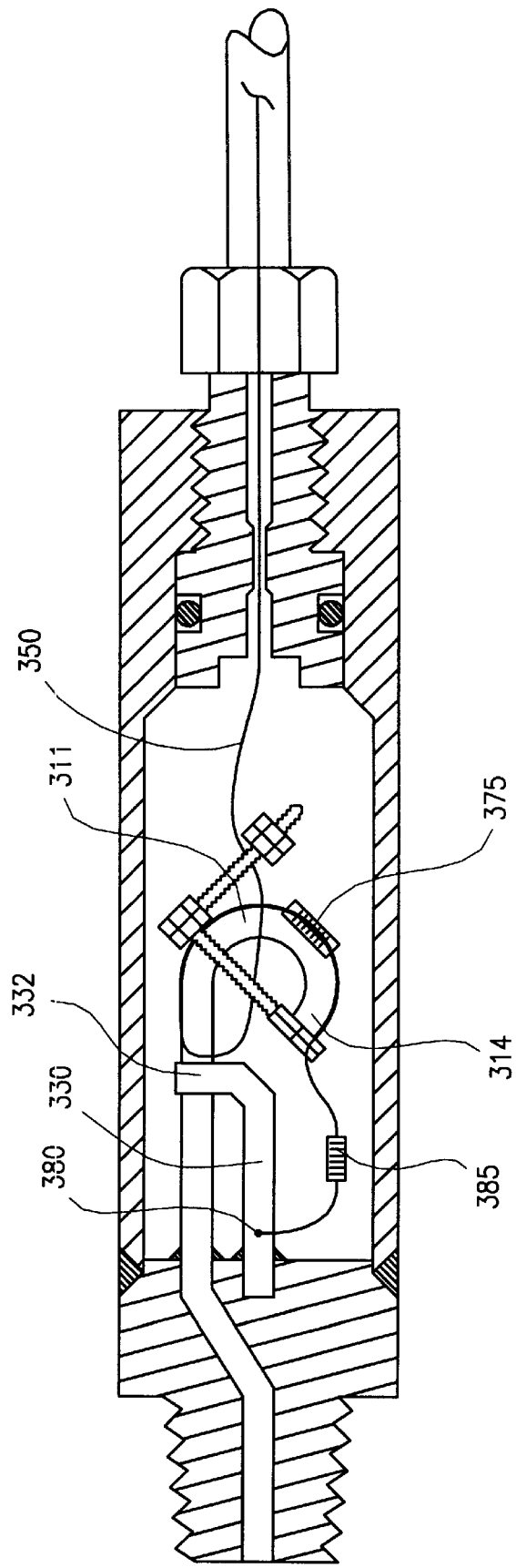
FIG. 3 is a cross-sectional view of a second embodiment of a pressure gauge utilizing optical strain sensors in accordance with the present invention.

Referring now to FIG. 3, a second embodiment of the Bourdon tube pressure gauge of the invention is illustrated. In the second embodiment of the invention illustrated in FIG. 3, the Bourdon tube 311 is basically in the same configuration as the Bourdon tube 11 of FIG. 1. However, the optical fiber 350 is welded or otherwise attached directly to the surface of the Bourdon tube 311 over a length of the Bourdon tube starting, for example, from an area adjacent to the mounting location 332 and extending to the free end 314 of the Bourdon tube 311. A Bragg grating 375 is formed in the optical fiber 350 in the length of optical fiber mounted directly to the surface of the Bourdon tube 311. Therefore, when the Bourdon tube 311 is exposed to the pressure of an environment, changes in the position of the Bourdon tube affects the strain in the Bragg grating 375, thereby providing an indication of the pressure in the environment. An additional length of the optical fiber 350 is mounted between the free end 314 of the Bourdon tube 311 and a mounting location 380 on the mounting post 330. This additional length of optical fiber includes a second Bragg grating 385. The length of optical fiber containing the second Bragg grating 385 is mounted such that the Bragg grating 385 does not experience a strain associated with the pressure in the environment, and the only strain which the Bragg grating 385 is exposed to is associated with the temperature of the environment. Therefore, a temperature compensation signal may be provided by the Bragg grating 385.

As with the two Bragg gratings 75,85 in the first embodiment of the invention illustrated in FIG. 1, the two Bragg gratings 375,385 in the second embodiment of the invention illustrated in FIG. 3 are selected to reflect optical signals within selected optical wavelength ranges, with the ranges being non-overlapping and different from one another so that the reflected optical signals from the two different Bragg grating sensors can be easily differentiated from one another.

Figure 4:
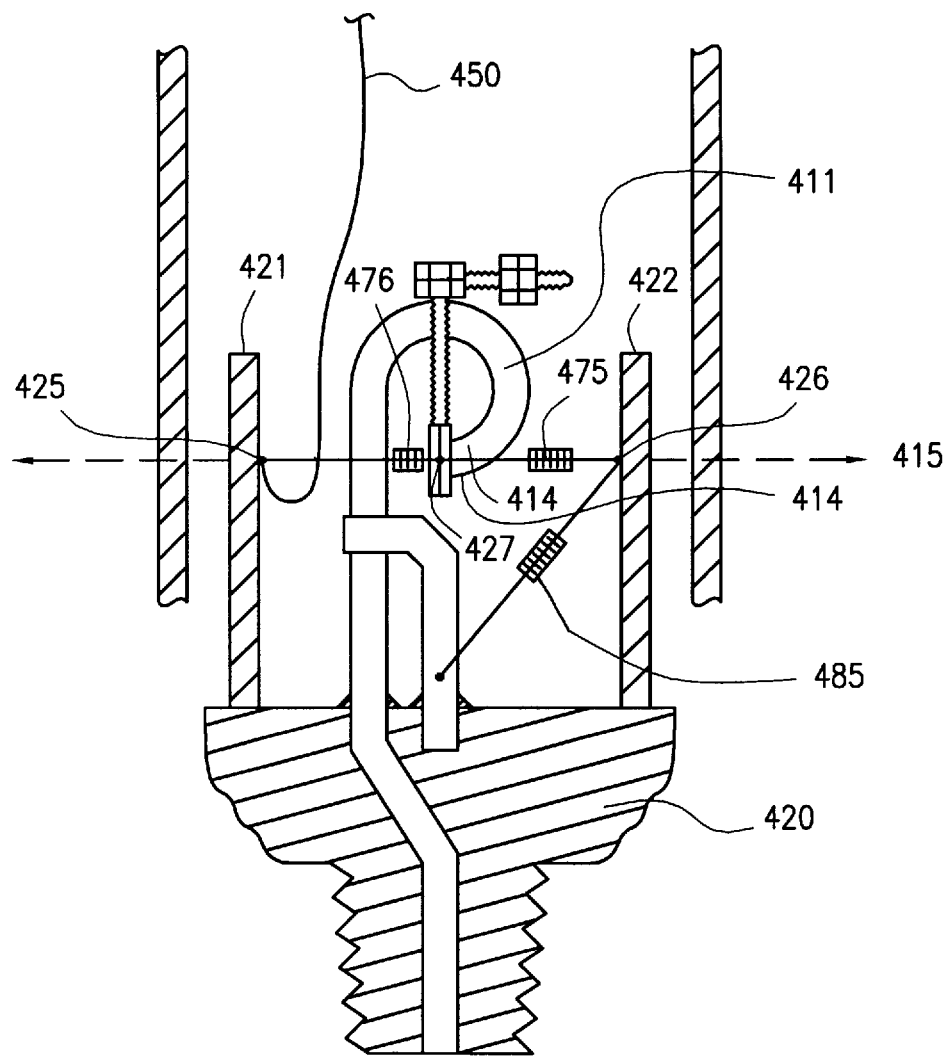
FIG. 4 is a cross-sectional view, partially broken away, of a third embodiment of a pressure gauge utilizing optical strain sensors in accordance with the present invention.

Referring now to FIG. 4, a third embodiment of the invention is illustrated. In the embodiment of the invention illustrated in FIG. 4, the Bourdon tube 411 forms more of a complete arc with the free end 414 of the Bourdon tube terminating at approximately the bottom of a circle formed by the Bourdon tube 411. In response to changes in the pressure of an environment being monitored by the Bourdon tube 411, the free end of the Bourdon tube 414 will move generally along an axis 415. Connected to the base 420 are a pair of mounting posts 421,422, and the optical fiber 450 is mounted along the axis 415 between a mounting location 425 on one mounting post 421 and a mounting location 426 on the other mounting post 422. The optical fiber is also mounted at a mounting location 427 on the free end 414 of the Bourdon tube 411. A pair of fiber Bragg gratings 475,476 are formed in the optical fiber between the mounting posts 421,422. One fiber Bragg grating is formed in the fiber between the first mounting post 421 and the mounting location 427 on the free end 414 of the Bourdon tube 411. The second fiber Bragg grating 475 is formed in the optical fiber between the mounting location 427 on the free end 414 of the Bourdon tube 411 and the mounting location 426 on the other mounting post 422. Both of the fiber Bragg gratings 475,476 are mounted under a pre-strain of equal magnitude. When the position of the Bourdon tube 411 changes due to changes in the pressure of the environment being monitored, the change in the position of the free end 414 of the Bourdon tube 411 changes the strain in the fiber Bragg gratings 475,476 so that the strain in one fiber Bragg grating is increased while the strain in the other fiber Bragg grating is decreased. This strain monitoring technique provides a very reliable and accurate indication of the pressure in the environment. As with the other embodiments of the invention, a temperature compensation Bragg grating 485 (reference grating) is also formed in the optical fiber 450 at the end of the optical fiber to provide temperature compensation for the pressure measurements.

Figure 5:
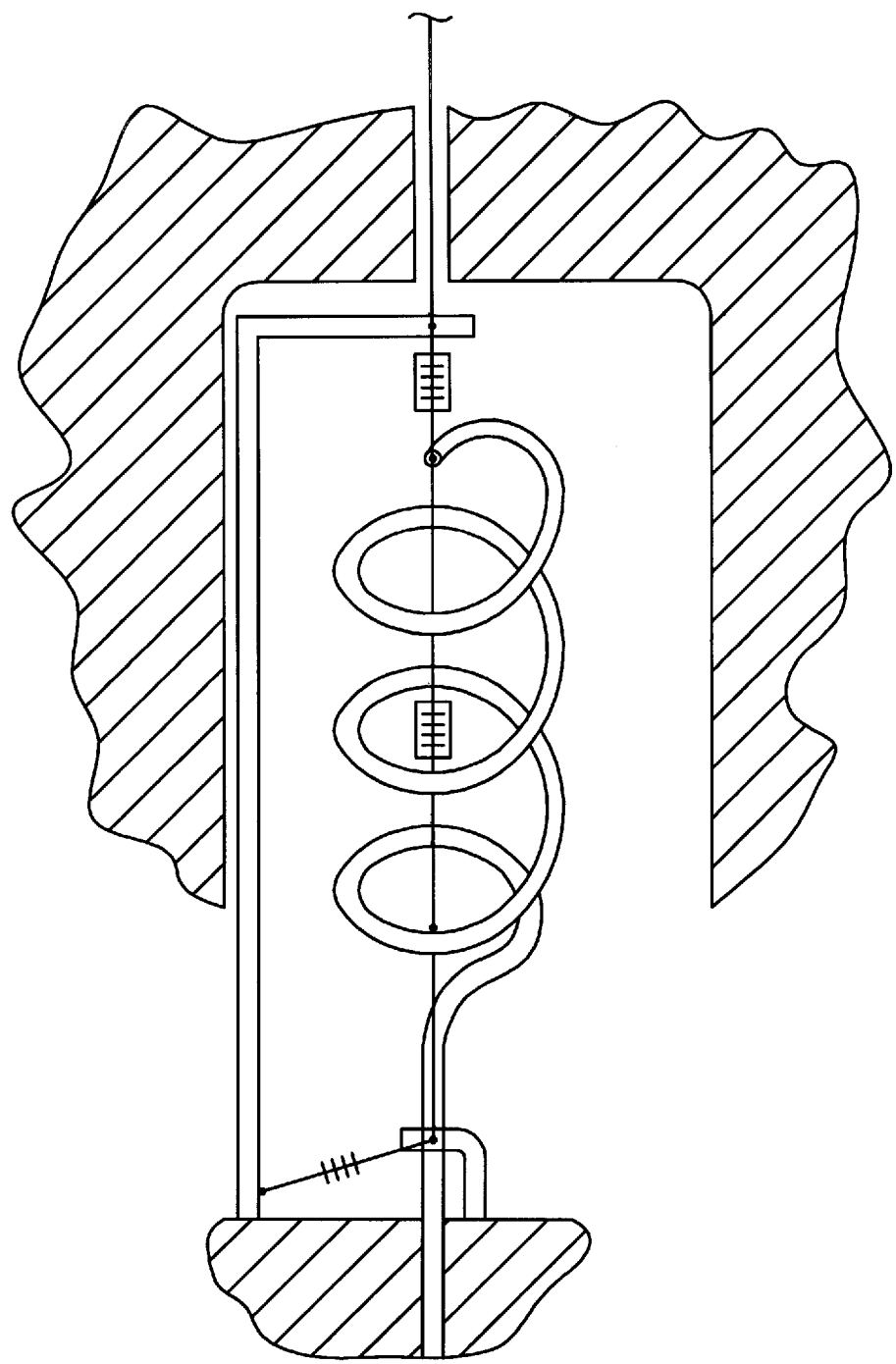
FIG. 5 is a cross-sectional view, partially broken away, of a fourth embodiment of a pressure gauge utilizing optical strain sensors in accordance with the present invention.

FIG. 5 illustrates a fourth embodiment of the invention that is similar to the embodiment of the invention illustrated in FIG. 4. In the embodiment of the invention illustrated in FIG. 5, two fiber Bragg gratings are mounted under an initial strain connected between two reference locations and the free end of a helical shaped Bourdon tube. Changes in the position of the free end of the Bourdon tube associated with changes in the pressure of the environment change the strain in the Bragg gratings, increasing the strain in one of the Bragg gratings while decreasing the strain in the other Bragg grating. A temperature compensation Bragg grating is also provided.

Figure 6:
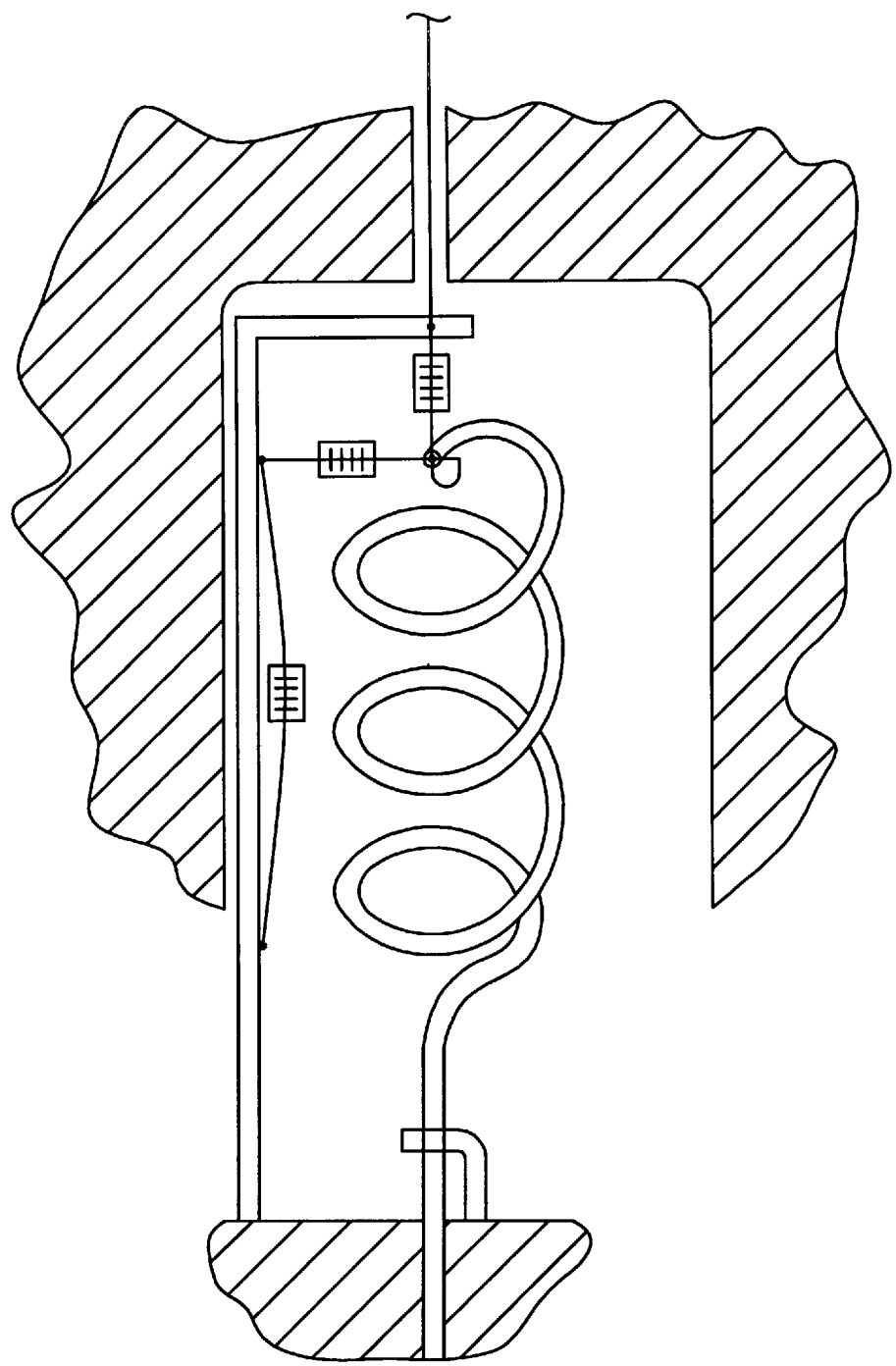
FIG. 6 is a cross-sectional view, partially broken away, of a fifth embodiment of a pressure gauge utilizing optical strain sensors in accordance with the present invention.

Referring to FIG. 6, in a fifth embodiment of the invention, a helical Bourdon tube is utilized with a pair of Bragg gratings mounted in different axes from one another. A temperature compensation Bragg grating is also provided.

Figure 7:
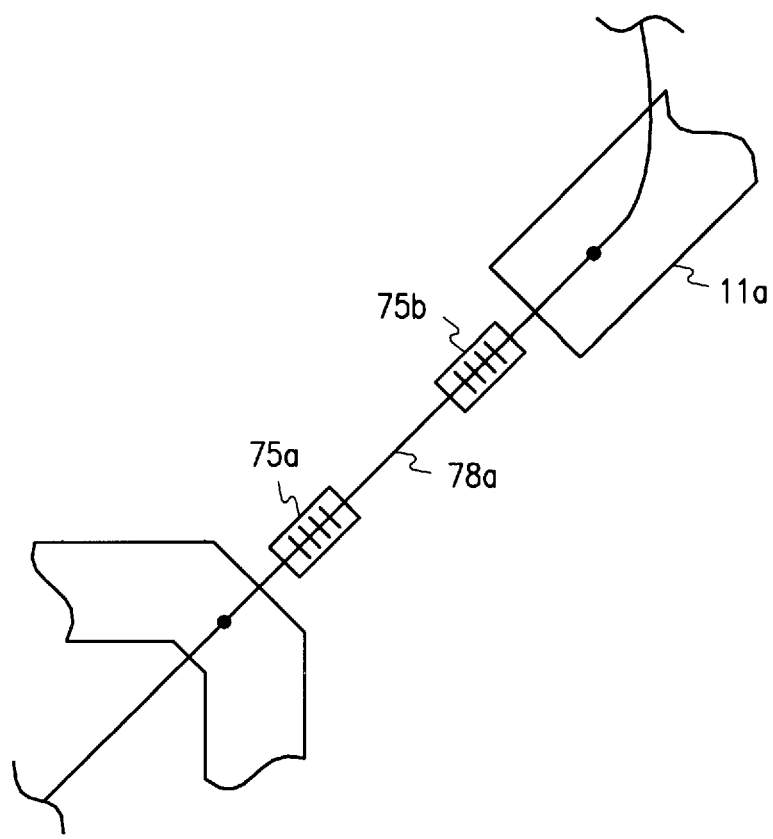
FIG. 7 is a cross-sectional view, partially broken away, of the pressure gauge of FIG. 1 utilizing a pair of Bragg gratings to form an optical strain sensor.

Referring to FIG. 7, although the invention has been illustrated using a single reflective grating 75 (FIG. 1), as explained herein, an alternate embodiment of the invention can utilize a pair of reflective gratings 75a and 75b within the same length of fiber 78a, thus forming a resonant cavity of longer length. Such a resonant cavity will also reflect light of a particular wavelength corresponding to central wavelength $\lambda$ of the reflective gratings 75a, 75b. A change in the cavity length caused by movement of the Bourdon tube lla will result in phase shift in the reflected light due to the change in optical path length within the reflective cavity. Such a device, termed a Fabry-Perot interferometer, can then provide a high sensitivity means of detecting strain in the optical fiber, and the resultant optical phase shift can be detected using standard interferometer instrumentation techniques. Thus, it is possible with this technique to realize a pressure transducer with passive temperature compensation, which has enhanced pressure sensitivity compared to the previously described device of FIG. 1 which utilizes a single intracore reflective grating. Alternatively, the pair of Bragg gratings may be used to form a lazing element for detection, for example by positioning an Ebrium doped length of optical fiber between the pair of Bragg gratings.

Although the invention is described herein as using either a circular (arc) or helical Bourdon tube, any suitable Bourdon tube may be used with the invention provided that the tube is responsive to the environment for causing a strain in an optical sensor. The invention is described herein as utilizing Bragg grating sensors mounted in a fiber between a free end of a Bourdon tube and a reference location, or alternatively in a fiber mounted directly to the surface of the Bourdon tube. However, any suitable configuration of the optical fiber containing the Bragg grating and the Bourdon tube may be used provided that the changes in the Bourdon tube in response to the pressure in the environment is accurately coupled to the Bragg grating in the fiber.

Although the pressure gauge of the invention is described herein as being well suited for use in a high temperature environment, it is also well suited for any other application of a Bourdon tube where a highly accurate and reliable measurement of system pressure is desired.

Although the invention has been described and illustrated with respect to exemplary embodiments thereof, the foregoing and other additions and omissions may be made therein and thereto without departing from the spirit and scope of the invention.

We claim:

1. A pressure gauge for sensing the pressure of a system, comprising:
   a Bourdon tube having a fixed open end exposed to the pressure of a system and a free end, a position of said free end being related to the system pressure;
   at least one optical strain sensor mounted to be strained by movement of said free end such that when said Bourdon tube is exposed to the system pressure, movement of said free end in response to system pressure causes a strain in said optical strain sensor;
   said optical strain sensor being responsive to said strain and to an input optical signal for providing a strain optical signal which is indicative of the system pressure.

2. The pressure gauge according to claim 1, wherein said optical strain sensor includes an optical fiber having at least one Bragg grating formed in said optical fiber.

3. The pressure gauge according to claim 2, wherein a length of said optical fiber containing said Bragg grating is attached between a reference location and said free end such that changes in said position of said free end changes said strain in said length of optical fiber resulting in a wavelength shift of said input optical signal reflected by said Bragg grating, the magnitude of said wavelength shift being indicative of a change in system pressure.

4. The pressure gauge according to claim 3, wherein said length of optical fiber is mounted between said free end of said Bourdon tube and said reference location under an initial strain, and wherein said initial strain changes in response to changes in said position of said free end.

5. The pressure gauge according to claim 4, further comprising a reference Bragg grating isolated from strain associated with the system pressure and responsive to the temperature of the system for causing a temperature induced strain, said reference Bragg grating being responsive to said temperature induced strain and said input optical signal for providing a temperature optical signal which is indicative of the temperature of the system.

6. The pressure gauge according to claim 5, wherein said temperature optical signal is provided for temperature compensation of said strain optical signal.

7. The pressure gauge according to claim 2, wherein a length of said optical fiber containing said Bragg grating is attached to a surface of said Bourdon tube such that changes in the position of said free end changes said strain in said length of optical fiber resulting in a wavelength shift of said input optical signal reflected by said Bragg grating, the magnitude of said wavelength shift being indicative of a change in system pressure.

8. The pressure gauge according to claim 7, further comprising a reference Bragg grating isolated from strain associated with the system pressure and responsive to the temperature of the system for causing a temperature induced strain, said reference Bragg grating being responsive to said temperature induced strain and said input optical signal for providing a temperature optical signal which is indicative of the temperature of the system.

9. The pressure gauge according to claim 8, wherein said temperature optical signal is provided for temperature compensation of said strain optical signal.

10. The pressure gauge according to claim 1, fer comprising a reference optical sensor isolated from strain associated with the system pressure and responsive to the temperature of the system for causing a temperature induced strain, said reference optical sensor being responsive to said temperature iduced strain and said input optical signal for providing a temperature optical signal which is indicative of the temperature of the system.

11. The pressure gauge according to claim 10, wherein said optical sensors include an optical fiber having Bragg gratings formed in the optical fiber.

12. The pressure gauge according to claim 10, fuirther comprising optical signal processing means responsive to said strain optical signal and said temperature optical signal for providing a pressure signal and a temperature signal respectively indicative of the pressure and temperature of said system.

13. A pressure gauge for sensing the pressure of a system, comprising:
   a Bourdon tube having a fixed open end expos ed to the system pressure and a free end, a position of said free end being related to the system pressure;
   a plurality of optical strain sensors mounted to be strained by movement of said free end such that when said Bourdon tube is exposed to the system pressure, movement of said free end in response to system pressure causes the strain on at least one of said optical strain sensors to increase while the strain on at least one additional optical strain sensor is reduced;
   said optical strain sensors being responsive to said strains and to an input optical signal for providing a strain optical signals which are indicative of the system pressure.

14. The pressure gauge according to claim 13, wherein said optical strain sensors include an optical fiber having Bragg gratings formed in the optical fiber.

15. The pressure gauge according to claim 14, wherein said at least one optical stram sensor includes a first length of said optical fiber containing at least one Bragg grating that is attached between a first reference location and said free end and wherein said at least one additional optical strain sensor includes a second length of said optical fiber containing at least one Bragg grating that is attached between a second reference location and said free end such that changes in said position of said free end changes the strain in said first and second lengths of optical fiber resulting in a wavelength shift of said input optical signal reflected by said Bragg gratings, the magnitude of said wavelength shift being indicative of a change in system pressure.

16. The pressure gauge according to claim 15, wherein said first and second lengths of optical fiber are mounted between said free end of said Bourdon tube and said first and second reference locations, respectively, under an initial strain, and wherein said initial strain changes in response to changes in said position of said free end.

17. The pressure gauge according to claim 16, further comprising a reference Bragg grating formed in said optical fiber isolated from strain associated with the system pressure and responsive to the temperature of the system for causing a temperature induced strain, said reference Bragg grating being responsive to said temperature induced strain and said input optical signal for providing a temperature optical signal which is indicative of the temperature of the system.

18. The pressure gauge according to claim 17, wherein said temperature optical signal is provided for temperature compensation of said strain optical signals.

* * * * *

UNITED STATES PATENT AND TRADEMARK OFFICE
CERTIFICATE OF CORRECTION

PATENT NO. : 5,877,426
DATED : March 2, 1999
INVENTOR(S) : Arthur D. Hay et al.

It is certified that error appears in the above-identified patent and that said Letters Patent is hereby corrected as shown below:

Column 2, claim 10,
Line 15, after "claim1", change "fer" to -- for --.

Column 2, claim 13,
Line 34, after "open end" delete "expos ed" and insert -- exposed --.

Column 2, claim 15,
Line 52, after "optical" delete "stram" and insert -- strain --.

Signed and Sealed this

Fifth Day of March, 2002

Attest:

JAMES E. ROGAN
*Attesting Officer*   *Director of the United States Patent and Trademark Office*